(12) United States Patent
Ji et al.

(10) Patent No.: US 6,496,475 B1
(45) Date of Patent: Dec. 17, 2002

(54) SYSTEM AND METHOD FOR SELECTIVE RECOVERY OF A FAILED OVERHEAD CHANNEL IN A WIRELESS NETWORK

(75) Inventors: Li Ji, Plano, TX (US); Laly Thao, Irving, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/354,490

(22) Filed: Jul. 16, 1999

(51) Int. Cl.[7] ................................................ H04L 1/22
(52) U.S. Cl. ...................................... 370/216; 370/228
(58) Field of Search ................................. 370/227, 228, 370/216, 225, 221, 219, 220, 217, 218

(56) References Cited

U.S. PATENT DOCUMENTS 6,262,973 B1 * 7/2001 Shirarshi et al. ............ 370/228

* cited by examiner

*Primary Examiner*—Ken Vanderpuye (57) ABSTRACT

An apparatus is disclosed for use in a wireless network base station capable of recovering from an overhead channel failure. The apparatus comprising a channel allocator circuit capable of (i) identifying a failed one of a plurality of channel elements responsible for a failed overhead channel and a first signal processing device associated with the failed overhead channel element; and (ii) selecting an available traffic channel element to replace the failed channel element, wherein the available traffic channel element is located on a second signal processing device that is processing a least number of overhead channels thereon.

28 Claims, 4 Drawing Sheets

SYSTEM AND METHOD FOR SELECTIVE RECOVERY OF A FAILED OVERHEAD CHANNEL IN A WIRELESS NETWORK

TECHNICAL FIELD OF THE INVENTION

The present invention is directed, in general, to wireless networks and, more specifically, to a system for selectively reconfiguring radio channels to recover from an overhead channel failure in wireless network base station.

BACKGROUND OF THE INVENTION

The quality of service provided by a base station (BS) in a wireless network is greatly influenced by the reliability and the redundancy of the radio resources responsible for carrying out communications between the base station and the mobile stations (e.g., cell phones, wireless modem-equipped computers, etc.) In the cell site covered by the base station, one of the most crucial components of a base station is the channel card. The channel card contains the channel elements that transmit and receive RF signals used to communicate with the mobile stations.

A channel element may be configured to operate as a traffic channel or as an overhead channel. Traffic channels carry the actual voice (or data) signals transmitted to and received from the mobile stations during a conversation (or a data transfer) Overhead channels carry the control signals that are used to establish traffic channels and, frequently, to break down the traffic channels.

There are four types of overhead channels: pilot, synchronization ("sync"), access, and paging. The pilot channel provides a means by which a mobile station may lock onto and acquire a BTS, provides timing reference for the system, and provides signal strength indications. The sync channel provides a mobile station with timing information necessary to synchronize with the system and also provides the following data: system time, long code state, protocol revision, paging channel data rate, and the like. The access channel allows a mobile station to communicate with the base station when the mobile station is not involved in a call. The mobile station uses the access channel when the mobile station responds to a paging message sent by the base station or when the mobile station originates a call. The paging channel provides a means of communication with a mobile station when the mobile stat on is not involved in a call. The paging channel is used to deliver system-wide configuration information, as well as messages that are specific messages to a particular mobile.

In some wireless network configurations, each of the pilot, sync, access and paging overhead channels are separately configured on individual channel elements. In other wireless network configurations, one or more of the overhead channels may be configured together on one, two, or three channel elements. Generally, however, a minimum of two channel elements are used to provide the overhead channels: the paging channel is configured by itself on one channel element, and the pilot, sync and access channels are configured on one two, or three other channel elements.

Frequently, the cell covered by a base station is divided into, for. example, three sectors of 120 degree each. Each sector has its own pilot, sync, access and paging channels. Assuming that only one access channel and one paging channel are configured per sector, each sector requires between two and four channel elements to provide overhead channels, depending on whether overhead channels are combined. Thus, assuming still that only one access channel and one paging channel are configured per sector, a three-sector base station may use anywhere between six and twelve channel elements to provide overhead channels. If more than one access channel and/or paging channel are configured, even more channel elements are required to provide overhead channels.

Since the overhead channels are essential to establishing and maintaining the traffic channels, failure of an overhead channel will have detrimental effects upon both existing calls and incoming calls unless a proper recovery procedure is immediately executed after the failure occurs. Prior art wireless networks typically execute one of the following overhead channel recovery procedures:

1. No Recovery

In some systems, no automated recovery procedure is used. If an overhead channel fails, system alarms are triggered that send a notice to system operators informing them of the failure. At that time, a service technician is dispatched to repair or replace the non-functioning channel card, signal processor, channel element, etc. In the interim, however, the base station is partially or completely crippled. The disadvantages with this implementation are obvious. Any overhead failure at least partially disrupts the services provided by the wireless network. Voice packets may be lost, resulting in degraded voice quality. Even worse, calls may be lost completely if mobile stations are unable to detect the base station's signals.

2. Standby Scheme

In some systems, a "standby" channel element is reserved specifically for overhead channel recovery procedure. A standby overhead channel can be reserved for any of the overhead channels, but it is more common. to reserve the standby channel element for the pilot channel. The disadvantages with this implementation is that the channel element is effectively removed from the resource pool of available channel elements. This reduces by one the number of calls that can be handled by each base station.

3. Traffic Channel Pool Scheme

In some systems, a channel element normally used to carry voice/data traffic (i.e., a traffic channel element) is reallocated by the system from the pool of available traffic channel elements and is reconfigured to replace the failed overhead channel. In the prior art, the traffic channels are organized based on logical location rather than physical location. The allocation process is based on selection of a traffic channel element at the end of the traffic channel element pool. The traffic channel pool scheme increases the system capacity by not wasting a channel element as a standby channel element. The overhead channel recovery still occurs quickly enough to avoid any potential system service interruption.

Each recovery scheme has its own unique advantages, but all three existing schemes share common disadvantages that are not adequately addressed in any particular scheme. One common disadvantage is that it is possible for many or even all of the recovered overhead channels to be reconfigured on the same channel card or even on the same channel digital signal processor (CDSP). If this occurs, a large number of control messages from the overhead channels may overload the DPRAM of the channel card carrying the overhead channels, while allowing the other available channel cards to remain idle. Another common disadvantage is related to the first one. If many or all of the overhead channels have been reconfigured on the same channel card or CDSP and that channel card or CDSP then experiences a failure, the system may be overwhelmed while attempting to reconfigure the overhead channels on other channel elements during failure recovery.

There is therefore a need in the art for a wireless network that suffers minimal performance degradation upon the occurrence of a failure in an overhead channel. In particular, there is a need for a recovery procedure that does not unduly overload any individual piece of base station equipment with a large number of overhead channels. There is a still further need for a wireless network that minimizes the risk of multiple overhead channel failures upon the failure of a single channel card or CDSP in a base station.

SUMMARY OF THE INVENTION

To address the above-discussed deficiencies of the prior art, it is a primary objective of the present invention to provide, for use in a wireless network base station, the base station capable of communicating in at least one overhead channel and a plurality of traffic channels with a plurality of mobile stations by means of a plurality of channel elements, an apparatus for recovering from an overhead channel failure comprising: 1) a failure detection circuit capable of detecting a failed overhead channel and generating a failure notification; and 2) a channel allocator capable of receiving the failure notification and, in response thereto, a) identifying a failed one of the plurality of channel elements responsible for the failed overhead channel and a first signal processing device associated with the failed overhead channel element; and b) selecting an available traffic channel element to replace the failed channel element, wherein the available traffic channel element is located on a second signal processing device that is processing a least number of overhead channels thereon.

According to one embodiment of the present invention, the second signal processing device and the first signal processing device comprise distinct digital signal processors.

According to another. embodiment of the present invention, the second signal processing device and the first signal processing device comprise distinct digital signal processors disposed on separate channel card circuits.

According to still another embodiment of the present invention, the least number of overhead channels is zero.

According to yet another embodiment of the present invention, the available traffic channel element is an idle traffic channel element.

According to a further embodiment of the present invention, the second signal processing device and the first signal processing device are disposed on separate channel cards.

According to a still further embodiment of the present invention, the apparatus further comprises a database associated with the channel allocator, wherein the database stores physical device location parameters associated with the plurality of channel elements.

According to a yet further embodiment of the present invention, the channel allocator causes the available channel to be reconfigured as an overhead channel capable of replacing the failed overhead channel.

The foregoing has outlined rather broadly the features and technical advantages of the present invention so that those skilled in the art may better. understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "controller" and "allocator" mean any device, system or part thereof that controls at least one operation, such a device may be implemented in hardware, firmware or software, or some combination of at least two of the same. It should be noted that the functionality associated with any particular controller or allocator may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction. with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
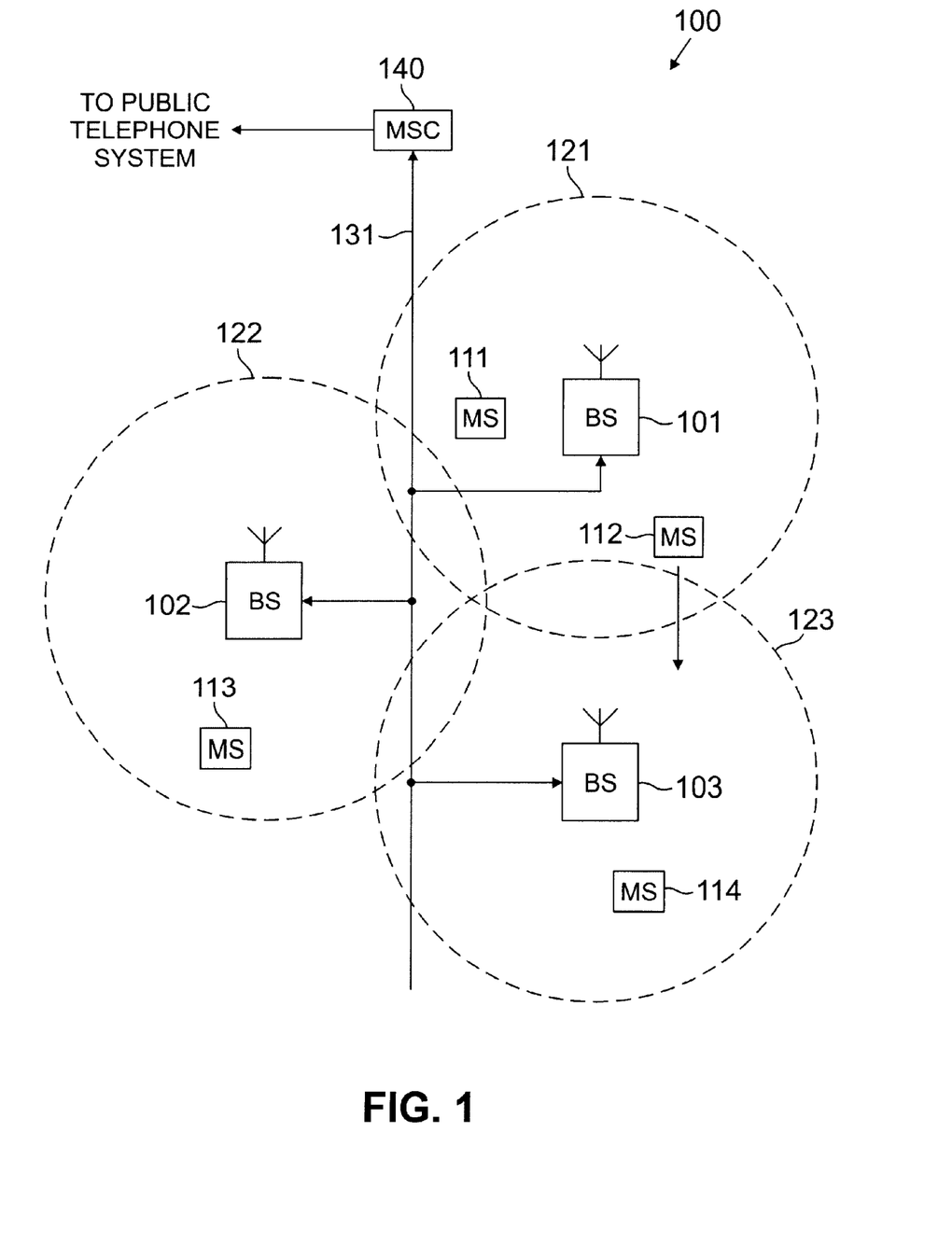
FIG. 1 illustrates an exemplary wireless network according to one embodiment of the present invention.

FIG. 1 illustrates an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations .(MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly. understood that the cell sites may have other regular or irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

A handoff transfers control of a call from a first cell to a second cell. For example, if MS 112 is in communication with BS 101 and senses that the signal from BS 101 is becoming weak, MS 112 may then switch to a base station that has a stronger signal, such as the signal transmitted by BS 103. MS 112 and BS 103 may then establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile station that is communicating in an overhead channel, rather than transmitting voice and/or data signals in the regular traffic channels.

Figure 2:
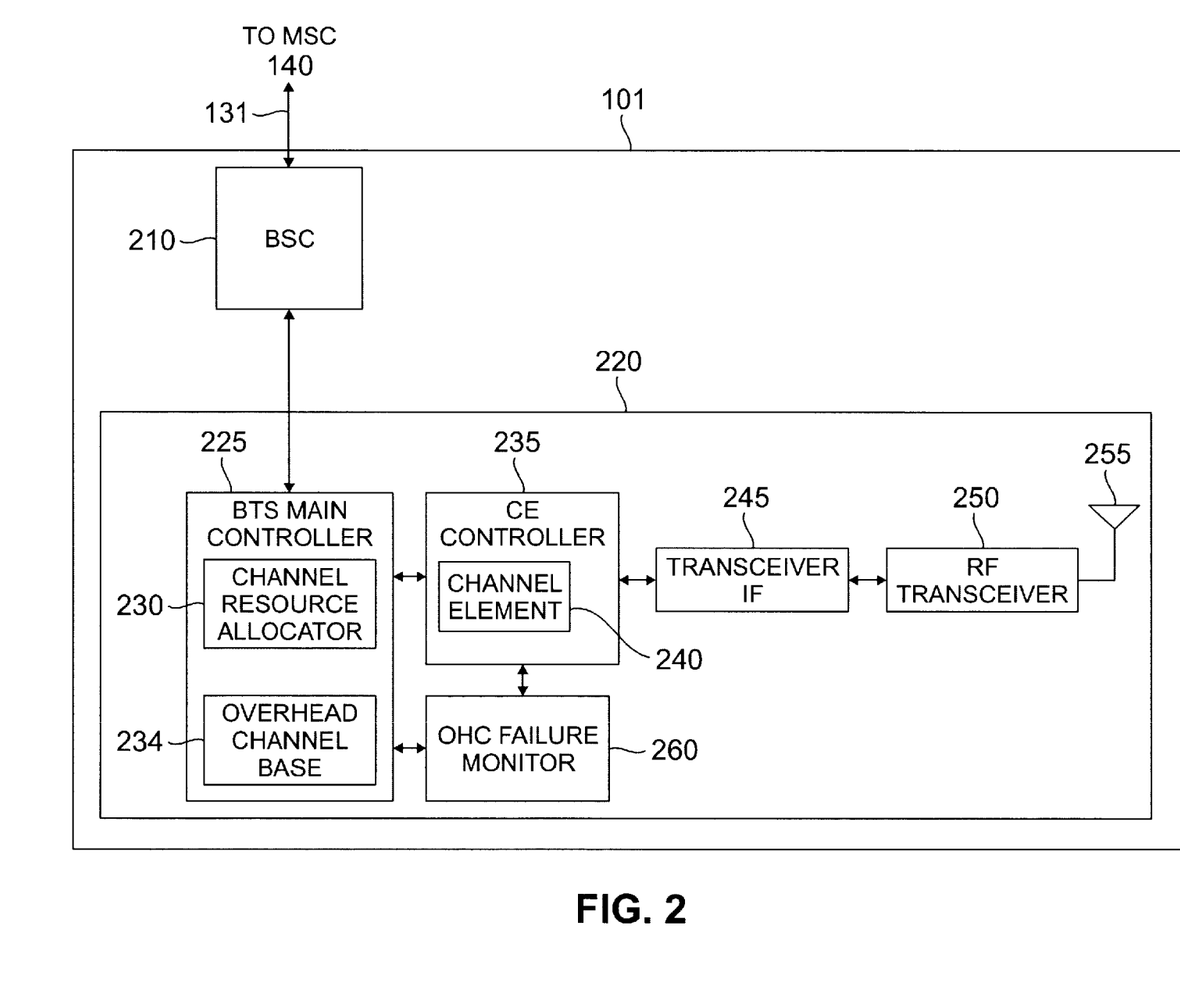
FIG. 2 illustrates. a channel resource allocator and an overhead channel database in an exemplary base station in the wireless network in FIG. 1 according to one embodiment of the present invention.

FIG. 2 illustrates channel resource allocator 230 and overhead channel database 234 in base station. 101 according to one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS main controller 225, which contains channel resource allocator 230 and overhead channel database 234 in accordance with the principles of the present invention. BTS 220 also comprises a channel element (CE) controller 235, which contains representative channel element 240, transceiver interface (IF) 245, RF transceiver unit 250, antenna array 255, and overhead channel (OHC) failure monitor 260.

BTS main controller 225 comprises processing circuitry and memory capable of executing an operating program that controls the overall operation of BTS 220 and communicates with BSC 210. Under normal conditions, BTS main controller 225 directs the operation of CE controller 235, which contains a number of channel elements, including representative channel element 240, that perform bi-directional communications in the forward channel and the reverse channel. A "forward" channel refers to outbound signals from the base station to the mobile station and a "reverse" channel refers to inbound signals from the mobile station to the base station.

As will be explained below in greater detail, channel resource allocator 230 assigns each of the channel elements in CE controller 235 to an overhead channel or a traffic channel as the case may be. Overhead channel database 234 maintains a record for each channel element that indicates whether the channel element is being used as an overhead channel or as a traffic channel. The record for each channel element also identifies the physical equipment in CE controller 235, such as the particular channel card or digital signal processor, that is servicing the channel element. This information regarding the physical equipment associated with each channel element is used by channel resource allocator 230 to distribute the overhead channels among different physical devices in order to minimize the possibility of redundant failures and to minimize recovery time after a failure.

In an exemplary embodiment of the present invention, the channel elements operate according to a code division multiple access (CDMA) protocol with the mobile stations in cell 121. In alternate embodiments of the present invention, the channel elements may operate according to a time division multiple access (TDMA) protocol or a frequency division multiple access (FDMA) protocol with the mobile stations in cell 121. Transceiver IF 245 transfers the bi-directional channel signals between CE controller 235 and RF transceiver unit 250.

Antenna array 255 transmits forward channel signals received from RF transceiver unit 250 to mobile stations in the coverage area of BS 101. Antenna array 255 also sends to RF transceiver 250 reverse channel signals received from mobile stations in the coverage area of BS 101. In a preferred embodiment of the present invention, antenna array 255 is multi-sector antenna, such as a three sector antenna in which each antenna sector is responsible for transmitting and receiving in a 120° arc of coverage area. Additionally, RF transceiver 250 may contain an antenna selection unit to select among different antennas in antenna array 255 during both transmit and receive operations.

Figure 3:
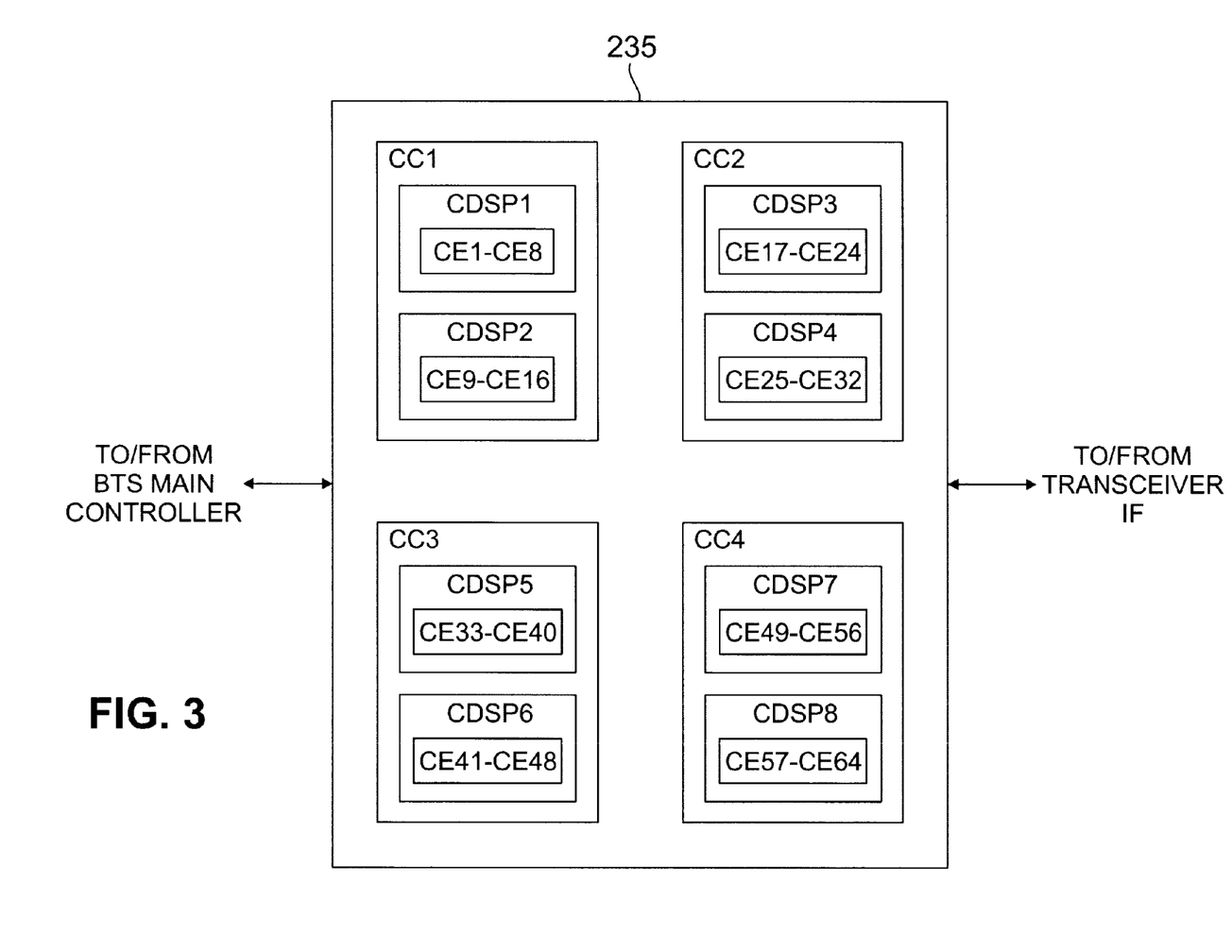
FIG. 3 illustrates an exemplary channel element (CE) controller in a base station in FIG. 1 according to one embodiment of the present invention.

FIG. 3 illustrates exemplary channel element (CE) controller 235 in base station 101 according to one embodiment of the present invention. The pool of available radio resources, or channel element resources, used by base station 101 are contained in CE controller 235. All of the overhead channels and traffic channels of base station 101 are configured using the "N" channel elements in CE controller 235. In the event of a failure of a channel element used as an overhead channel in base station 101, a new overhead channel must be configured from one of the remaining channel elements.

In the illustrated exemplary embodiment, CE controller 235 comprises four channel cards (CC), arbitrarily labeled CC1, CC2, CC3, and CC4. Each channel card comprises two channel digital signal processors (CDSPS), for a total of eight CDSPs in base station 101. Each CDSP comprises eight channel elements (CE), or a total of sixty-four channel elements in base station 101.

CC1 comprises CDSP1 and CDSP2. The eight channel elements in CDSP1 are arbitrarily labeled CE1–CE8. The eight channel elements in CDSP2 are arbitrarily labeled CE9–CE16. In a similar manner, CC2 comprises CDSP3 and CDSP4. The eight channel elements in CDSP3 are arbitrarily labeled CE17–CE24 and the eight channel elements in CDSP4 are arbitrarily labeled CE25–CE32. Likewise, CC3 comprises CDSP5 and CDSP6. The eight channel elements in CDSP5 are arbitrarily labeled CE33–CE40 and the eight channel elements in CDSP6 are arbitrarily labeled CE41–CE48. Finally, CC4 comprises CDSP7 and CDSP8. The eight channel elements in CDSP7 are arbitrarily labeled CE49–CE56 and the eight channel elements in CDSP8 are arbitrarily labeled CE57–CE64.

The numbers of channel cards, channel digital signal processors, and channel elements shown in base station 101 and CE controller 235 are selected by way of example only. In real world applications, the numbers of channel cards, channel digital signal processors, and channel elements may vary according to the type of wireless network, the equipment selected, the anticipated wireless traffic in the coverage area of the base station, the cell size, the number of antenna sectors, and a variety of other factors. Additionally, for the purposes of clarity and brevity in describing the pool of channel element resources in CE controller 235, other circuit components in CE controller 235, such as I/O interfaces, data buffers, communication buses, switches, and the like, are not shown.

As noted above, a base station may use one to four channel elements to implement the overhead channels depending on whether the paging, access, pilot and sync channels are assigned to individual channels or are combined in some manner. If base station 101 is divided into three sectors, each sector uses its own overhead channels. In such a case, base station 101 may use between two and twelve channel elements to implement the overhead channels. The remainder of the 64 channel elements are then used for traffic channels.

The present invention minimizes the impact of a failure of a channel element, a channel digital signal processor, or a channel card by distributing the overhead channels to different CDSPs and different channel cards to avoid redundancy failures. Channel resource allocator 230 and overhead channel database 235 reconfigure another channel element according to two criteria. The first criteria is whether or not an available channel element is located on the same CDSP or channel card as the overhead channel element that failed. The second criteria is the minimization of the number of overhead channels on each CDSP or channel card.

Figure 4:
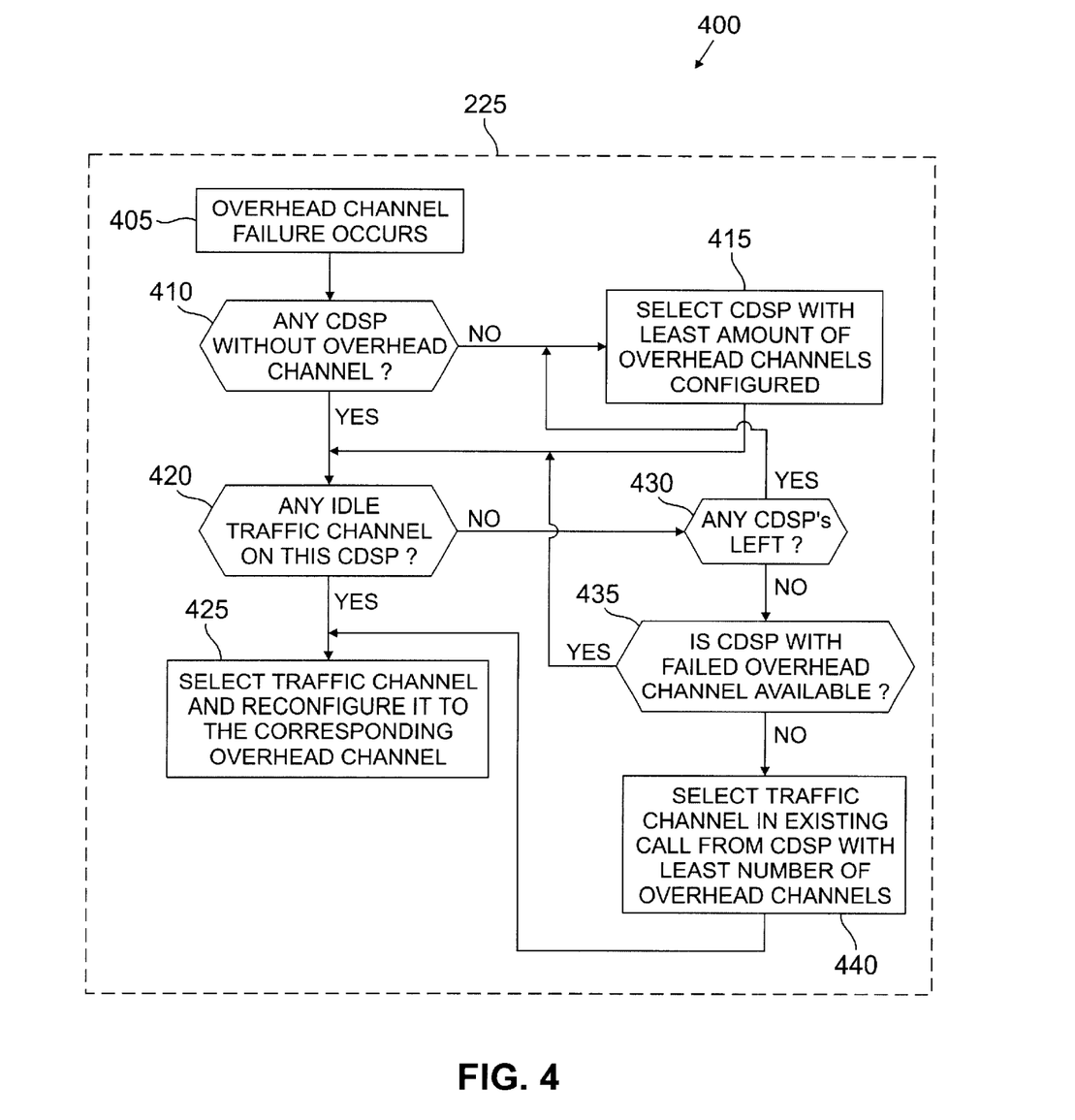
FIG. 4 is a flow diagram illustrating the operation of an exemplary channel resource allocator and an exemplary overhead channel database according to one embodiment of the present invention.

FIG. 4 depicts flow diagram 400, which illustrates the operation of BTS main controller 225, including channel resource allocator 230 and overhead channel database 234, in base station 101 according to one embodiment of the present invention. The channel element selection scheme provided by the present invention is non-redundant in the sense that channel resource allocator 230 does not reallocate a channel element with the same physical attributes (i.e., same CC, same CDSP) as the failed overhead channel to be reconfigured as an overhead channel during failure recovery. This non-redundant selection process minimizes the chances of repeated failure.

In the exemplary embodiment, channel resource allocator 230 reallocates a traffic channel element based on at least two criteria: 1) channel card location of other overhead channels, and 2) CDSP location of other overhead channels. In many base stations, there are two or more communication buses available for communicating with the channel cards. In some embodiments of the present invention, bus location may be used as a third selection criteria. However, bus failures are a very uncommon cause of overhead channel failure. Generally, it is sufficient to use just channel card location and CDSP location.

The allocation scheme is selective in nature because the resource allocation task executed by channel resource allocator 230 and overhead channel database 234 allocates a channel element based on a rigid selection algorithm designed to prevent the likelihood of another failure. Another intention of this non-redundant selective scheme algorithm is to evenly distribute the overhead channels to different CDSPs. In general, channel resource allocator 230 uses the data in overhead channel database 234 to reconfigure the new overhead channel on a CDSP other than the one containing the failed overhead channel.

The recovery process is initiated, when an overhead channel failure occurs and is detected by OHC failure monitor 260 (process step 405). OHC failure monitor 260 then sends an alarm notification to channel resource allocator 230 identifying the particular one of channel elements CE1–CE64 that carried the overhead channel that failed. OHC monitor 260 is intended as a generic representation of various types of failure detection circuits that are well known in the art. In reality, an overhead channel failure may be detected in a number of ways and depends largely on the implementation chosen by a system designer. The failure may be detected by built-in self test circuitry (BIST) located in one of the CDSP1–CDSP8, by BIST circuitry on CC1–CC4, or by signal monitoring circuitry on BTS main controller 225. The CDSPs, channel cards, or monitoring circuitry then sends an alarm notification to channel resource allocator 230 identifying the particular one of channel elements CE1–CE64 that carried the overhead channel that failed.

Channel resource allocator 230 searches in overhead channel database (OHCD) 234 for a CDSP that does not have any channel element presently configured as an overhead channel (process step 410). If such a CDSP is found, that CDSP is selected for possible reconfiguration of the failed overhead channel. If each CDSP has at least one overhead channel already configured on it, then channel resource allocator 230 selects a CDSP having the least number of overhead channels for possible reconfiguration as the failed overhead channel (process step 415).

Next, channel resource allocator 230 searches in OHCD 234 to determine if the selected CDSP has an available (i.e., idle) a traffic channel element that can be reconfigured as the failed overhead channel (process step 420). If such an idle traffic channel element exists on the selected CDSP, channel resource allocator 230 selects that traffic channel element for reconfiguration and removes it from the resource allocation pool by updating the information in OHCD 234 (process step 425). Channel resource allocator 230 then reconfigures the selected traffic channel element as the failed overhead channel and, optionally, may attempt to reconfigure the failed overhead channel element as a traffic channel.

If there are no idle traffic channel elements on the selected CDSP, channel resource allocator 230 selects another CDSP having the next least number of overhead channels already configured on it, and repeatedly loops through process steps 415 and 420 until an available idle traffic channel element is reconfigured (i.e., process step 425) or until it is determined that none of the CDSPs have an available idle traffic channel element (process step 430). In the case that each CDSP has at least one overhead channel already on it and no CDSP has an idle traffic channel element, then channel resource allocator 230 determines if there is an available idle traffic channel element on the CDSP on which the failed overhead channel is located. If so, channel resource allocator 230 reconfigures the available traffic channel on that CDSP to replace the failed overhead channel on the same CDSP (process steps 435, 420, and 425).

In the extreme case where there is no idle traffic channel on any CDSP, including the CDSP having the failed overhead channel, channel resource allocator 230 may reconfigure a busy traffic channel element involved in an existing call. The busy traffic channel element is selected by channel resource allocator 230 from the CDSP with the least number of configured overhead channels (process step 240). Channel resource allocator 230 then reconfigures the selected traffic channel element as the failed overhead channel and removes it from the resource allocation pool by updating the information in OHCD 234 (process step 425).

As is evident from the descriptions above, overhead channel database 234 is needed to store and modify overhead channel location information. At the system start time, the original overhead channel locations for each sector in the cell site are recorded in overhead channel database 234. After that, every time an overhead channel element is reconfigured, a corresponding overhead channel element modification is made in overhead channel database 234. The overhead channel information stored in overhead channel database 234 includes the following:

1. Sector Identification—the sector in which the overhead channel element operates (i.e., sector A, B, or C in a three sector antenna array);
2. CDMA Frequency—the CDMA channel number in which this overhead channel operates. (i.e., channel 825, channel 720, etc.) TDMA and FDMA systems will contain comparable channel identification data.
3. Channel Type—the overhead channel type, such as pilot, sync, access, paging, or any combination of these.
4. CDSP number—the physical CDSP number on which the overhead channel resides. In the exemplary embodiment, there are four channel cards, and each channel card contains 2 CDSPs. Hence, the physical CDSP number will be from 1–8.
5. Channel element number—the relative channel element number within a CDSP. Each CDSP contains eight channel elements. Hence the relative channel element number will be from 1–8.

After a traffic channel element is selected to be reconfigured as the failed overhead channel, the overhead channel database 234 is modified to reflect the new overhead channel location. The changes should include two parts: change the original overhead channel location information and change the newly selected channel element location information.

Although the present invention has been described in detail, those skilled in the art should understand that they can make various changes, substitutions and alterations herein without departing from the spirit and scope of the invention in its broadest form.

What is claimed is:

1. For use in a base station of a wireless network, said base station capable of communicating in at least one overhead channel and a plurality of traffic channels with a plurality of mobile stations by means of a plurality of channel elements, an apparatus for recovering from an overhead channel failure comprising:
   a failure detection circuit capable of detecting a failed overhead channel and generating a failure notification; and
   a channel allocator capable of receiving said failure notification and, in response thereto:
      identifying a failed one of said plurality of channel elements responsible for said failed overhead channel and a first signal processing device associated with said failed overhead channel element;
      selecting an available traffic channel element to replace said failed channel element, wherein said available traffic channel element is located on a second signal processing device that is processing a least number of overhead channels thereon.

2. The apparatus set forth in claim 1 wherein said second signal processing device and said first signal processing device comprise distinct digital signal processors.

3. The apparatus set forth in claim 2 wherein said second signal processing device and said first signal processing device comprise distinct digital signal processors disposed on separate channel card circuits.

4. The apparatus set forth in claim 1 wherein said least number of overhead channels is one.

5. The apparatus set forth in claim 1 wherein said available traffic channel element is an idle traffic channel element.

6. The apparatus set forth in claim 1 wherein said second signal processing device and said first signal processing device are disposed on separate channel cards.

7. The apparatus set forth in claim 1 further comprising a database associated with said channel allocator, wherein said database stores physical device location parameters associated with said plurality of channel elements.

8. The apparatus set forth in claim 1 wherein said channel allocator causes said available traffic channel element to be reconfigured as an overhead channel capable of replacing said failed overhead channel.

9. A wireless network comprising:
   a plurality of base stations, each of said base stations capable of establishing and maintaining communication links with a plurality of a mobile stations by means of at least one overhead channel and a plurality of traffic channels; and
   an apparatus for recovering from an overhead channel failure comprising:
      a failure detection circuit capable of detecting a failed overhead channel and generating a failure notification; and
      a channel allocator capable of receiving said failure notification and, in response thereto:
         identifying a failed one of said plurality of channel elements responsible for said failed overhead channel and a first signal processing device associated with said failed overhead channel element;
         selecting an available traffic channel element to replace said failed channel element, wherein said available traffic channel element is located oh a second signal processing device that is processing a least number of overhead channels thereon.

10. The wireless network set forth in claim 9 wherein said second signal processing device and said first signal processing device comprise distinct digital signal processors.

11. The wireless network set forth in claim 10 wherein said second signal processing device and said first signal processing device comprise distinct digital signal processors disposed on separate channel card circuits.

12. The wireless network set forth in claim 9 wherein said least number of overhead channels is one.

13. The wireless network set forth in claim 9 wherein said available traffic channel element is an idle traffic channel element.

14. The wireless network set forth in claim 9 wherein said second signal processing device and said first signal processing device are disposed on separate channel cards.

15. The wireless network set forth in claim 9 further comprising a database associated with said channel allocator, wherein said database stores physical device location parameters associated with said plurality of channel elements.

16. The wireless network set forth in claim 9 wherein said channel allocator causes said available traffic channel element to be reconfigured as an overhead channel capable of replacing said failed overhead channel.

17. For use in a base station of a wireless network, the base station capable of communicating in at least one overhead channel and a plurality of traffic channels with a plurality of mobile stations by means of a plurality of channel elements, a method for recovering from an overhead channel failure comprising the steps of:

detecting a failed overhead channel;

identifying a failed one of the plurality of channel elements responsible for the failed overhead channel;

identifying a first signal processing device associated with the failed overhead channel element;

determining a pool of available traffic channel elements capable of being reconfigured to replace the failed overhead channel element; and selecting from the pool a replacement traffic channel element, wherein the replacement traffic channel element is located on a second signal processing device that is processing a least number of overhead channels.

18. The method set forth in claim 17 wherein the second signal processing device and the first signal processing device comprise distinct digital signal processors.

19. The method set forth in claim 17 wherein the second signal processing device and the first signal processing device comprise distinct digital signal processors disposed on separate channel card circuits.

20. The method set forth in claim 17 wherein the step of determining a pool of available traffic channel elements comprises the step of determining which ones of the plurality of channel element are idle.

21. For use in a base station of a wireless network, said base station capable of communicating in at least one overhead channel and a plurality of traffic channels with a plurality of mobile stations by means of a plurality of channel elements, an apparatus for recovering from an overhead channel failure operable to (i) identify a failed one of a plurality of channel elements responsible for a failed overhead channel and a first signal processing device associated with a failed overhead channel element, and (ii) select, in response thereto, an available traffic channel element to replace said failed channel element, wherein said available traffic channel element is located on a second signal processing device that is processing a least number of overhead channels thereon.

22. The apparatus set forth in claim 21 wherein said second signal processing device and said first signal processing device comprise distinct digital signal processors.

23. The apparatus set forth in claim 22 wherein said second signal processing device and said first signal processing device comprise distinct digital signal processors disposed on separate channel card circuits.

24. The apparatus set forth in claim 21 wherein said least number of overhead channels is one.

25. The apparatus set forth in claim 21 wherein said available traffic channel element is an idle traffic channel element.

26. The apparatus set forth in claim 21 wherein said second signal processing device and said first signal processing device are disposed on separate channel cards.

27. The apparatus set forth in claim 21 further comprising a database operable to store physical device location parameters associated with said plurality of channel elements.

28. The apparatus set forth in claim 21 wherein said available traffic channel element to be reconfigured as an overhead channel capable of replacing said failed overhead channel.

* * * * *

UNITED STATES PATENT AND TRADEMARK OFFICE
CERTIFICATE OF CORRECTION

PATENT NO. : 6,496,475 B1 Page 1 of 1
DATED : December 17, 2002
INVENTOR(S) : Li Ji and Laly Thao It is certified that error appears in the above-identified patent and that said Letters Patent is hereby corrected as shown below:

<u>Column 1,</u>
Line 46, delete "stat on" and insert -- station --; and

<u>Column 11,</u>
Line 1, delete "oh" and insert -- on --.

Signed and Sealed this

Eighth Day of November, 2005

JON W. DUDAS
*Director of the United States Patent and Trademark Office*